A. J. BALDWIN.
METHOD OF AND MACHINE FOR MAKING WIRE GLASS.
APPLICATION FILED JULY 8, 1907.
959,102. Patented May 24, 1910.
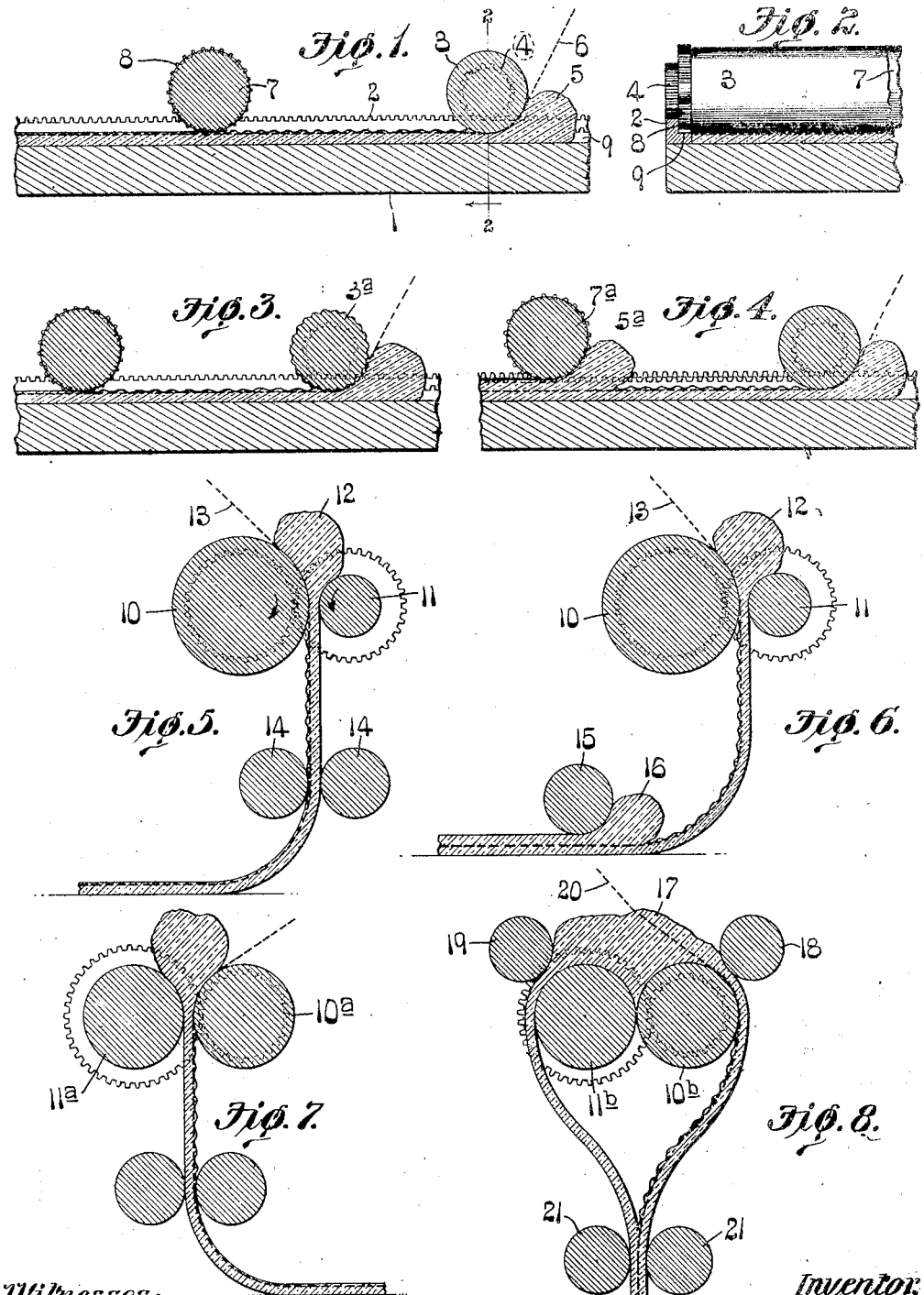
Witnesses:
Geo. R. Kadoon
A. J. McCauley
Inventor
Arthur J. Baldwin
By Bakewell Cornwall
attys

UNITED STATES PATENT OFFICE.

ARTHUR J. BALDWIN, OF EAST ORANGE, NEW JERSEY.

METHOD OF AND MACHINE FOR MAKING WIRE-GLASS.

959,102. Specification of Letters Patent. Patented May 24, 1910.

Application filed July 8, 1907. Serial No. 382,814.

*To all whom it may concern:*

Be it known that I, ARTHUR J. BALDWIN, a citizen of the United States, residing in East Orange, county of Essex, and State of New Jersey, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figure 1 is a sectional view of a conventional illustration of a machine for making wire glass according to my improvement; Fig. 2 is an end elevational view, partly in section, of the mechanism shown in Fig. 1; and Figs. 3 to 8 inclusive are conventional sectional views showing modified forms.

This invention relates to a new and useful improvement in the method of and machine for making wire glass, the object being to utilize a differential peripheral speed in the forming rollers for causing the wire to be buried beneath the surface of the sheet of glass.

In Patent No. 346,695, dated August 3, 1896, to Edward Walsh, Jr., there is described a machine for rolling plate glass in which the diameter of the forming roller is greater or less than the pitch line diameter of the conjoined gear. By means of this differential diameter, where the diameter of the roller is larger than the diameter of the pitch line of the gear, the peripheral speed of the roller is of course greater than the peripheral speed of the pitch line of the gear (the movement of the gear being constrained by engagement with its meshing rack), and consequently in forming a sheet of glass the surface of the roller pushes back or crowds the surface of the sheet of glass, producing from the surplus glass thus forced behind the roller an irregular and uneven surface which has been designated as an "ondoyant" surface. Where the diameter of the roller is less than the diameter of the pitch line of its conjoined gear, it is obvious that the converse of the above proposition is true, to wit, the peripheral speed of the roller being less than the peripheral speed of the pitch line of the gear there will be a dragging action on the surface of the sheet of glass, and this dragging action tends to planish or polish the surface of the glass.

The broad idea of my invention may be said to consist in using, in the formation of a sheet of wire glass, and in connection with other suitable and related apparatus, a roller having an excessive peripheral speed, the surface of which roller crowds or pushes back the glass over the wire mesh as the latter is being introduced into the freshly laid sheet of glass. This may be applied to the well understood "single-pour" process and apparatus disclosed in the Shuman Patent No. 483,020, issued September 20, 1892, as, for example, by providing the wire-embedding roller with means such as corrugations that run longitudinally of the roller and extend beyond the diameter of the pitch line of its conjoined gear; or, similarly, to the wire-embedding roller of the Letters Patent to Shuman No. 605,754, dated June 14, 1898.

As will be understood from subsequent description, my invention is susceptible of widely varying use in wire glass manufacture, for example in the "two-pour" processes exemplified in the patents to Schmertz No. 791,217, dated May 30, 1895, and Reissue No. 12,443, dated January 30, 1896.

In Figs. 1 and 2 I have illustrated a construction for carrying out the broad idea of my invention, in which 1 indicates a table bed and 2 racks arranged along the longitudinal edges thereof. 3 is a smooth roller arranged above the table and having gears 4 conjoined to the ends thereof, said gears 4 meshing with the racks 2. The diameter of roller 3 is greater than the diameter of the pitch line of its conjoined gears 4, and consequently when a pour of molten glass 5 is made in front of the roller 3 and said roller is rolled along said table (or the table moved under the roller, as the case may be), the molten glass is rolled into sheet form, the glass adjacent the upper surface being crowded or pushed back on account of the excessive peripheral speed of the roller 3, and an uneven or ondoyant surface produced as shown in Fig. 1. 6 indicates wire mesh which is fed between the roller 3 and the pour of glass 5. The molten glass crowding through the meshes of the wire 6, comes in contact with the surface of roller 3 where it is subjected to a wiping or crowding action and slightly displaced, the surplus glass being left on top of the wire mesh, and completely burying said wire mesh. If it is desired that the sheet of wire glass thus formed shall be left with this ondoyant surface, the sheet can now be considered complete.

In Fig. 1, I have shown a smoothing roller 7 which acts upon the uneven upper surface of the sheet, the diameter of this smoothing roller being coincident with the diameter of the pitch line of its conjoined gear 8 which meshes with a rack 9 alongside of the rack 2. The action of this smoothing roller 7 is to impart to the upper surface of the sheet of glass a smooth even surface.

In Fig. 3, I have shown a construction in all respects similar to that shown in Fig. 1, except that the forward roll $3^a$ is formed with recesses and projections on its periphery which tend to bite into the molten glass and displace definite quantities of glass, depositing such displaced glass on top of wire mesh. This roller $3^a$ may be longitudinally fluted, as shown; that is to say, these flutings or corrugations, extending lengthwise of the roll and projecting from its surface, also preferably extend beyond the diameter of the pitch line of its conjoined gear, and act upon the surface of the glass in a manner somewhat similar to the action of the blades of a paddle wheel upon the surface of the water; thus this roll both introduces the wire by the corrugations, as in the Shuman patents above referred to, and throws the molten glass back over the freshly introduced wire mesh. When provided with these longitudinal flutings or paddles, the diameter of the roll as measured in the indentations between them need not necessarily exceed, or even equal, the diameter of the pitch line of the conjoined gear. This roll may be constructed in any other well known manner for carrying out the functions intended.

In Fig. 4, I have shown another modified form in which a sheet of wire glass with an uneven or ondoyant surface is produced by mechanism such as that shown in Fig. 1, and on which sheet is a second pour $5^a$ in advance of the finishing roller $7^a$, whereby the irregularities in the upper surface of the first formed sheet are completely covered by a second layer or finishing coating of glass.

In Figs. 5 to 8, I have shown modifications wherein the use of a table on which the sheet is initially formed is dispensed with. In Fig. 5, 10 and 11 are two rollers of unequal diameters, to which rollers are connected driving gears whose pitch line diameters are equal. The peripheral speeds of rollers 10 and 11 are different, that of 10 exceeding that of 11. 12 is a pour of glass on the rollers 10 and 11, and 13 is the wire mesh between the pour of glass and the roller 10. As the rollers 10 and 11 are rotated, the molten glass is drawn in the pass between said rollers, the excessive speed of roller 10 crowding the glass downwardly and covering the wire mesh 13, while the lesser peripheral speed of roller 11 has a retarding polishing action on the other surface of the sheet of glass. If it is desired to smooth the uneven or ondoyant surface formed by the roller 10, two finishing rollers 14 driven with equal peripheral speeds may be employed.

In Fig. 6 I have shown the same apparatus as that illustrated in Fig. 5, but have provided a finishing roller 15 coöperating with the second pour of glass 16 to spread a finishing coating of glass over the uneven surface of the first formed sheet.

In Fig. 7, instead of having the rollers $10^a$ and $11^a$ of unequal diameters said rollers are of the same diameter, but the pitch lines of their conjoined driving gears are of unequal diameters, which produces a differential peripheral speed in the rollers $10^a$ and $11^a$ for the same purpose described with respect to the construction shown in Fig. 5.

In Fig. 8, I have shown an apparatus for forming two separate sheets of glass from a single pour 17, the rollers $10^b$ and $11^b$ being of smaller diameter but having different peripheral speeds, as described with respect to the construction shown in Fig. 7. A roller 18 is intended to be driven with less peripheral speed than the roller $10^b$, while roller 19 is intended to be driven with substantially the same peripheral speed as roller $11^b$. The wire mesh 20, by tension, is drawn through the pour 17 and adjacent the roller $10^b$, which roller $10^b$ forms the uneven or ondoyant surface adjacent the wire mesh. The two sheets of glass, one having a wire mesh embedded therein, thus formed are brought together and welded by rollers 21.

It will be evident that the application, in wire glass manufacturing apparatus of a roll whose peripheral speed of rotation is greater than the relative speed of progression between the roll and the table, is susceptible of wide variation and may be utilized in different methods of such manufacture as it is now being carried on. In speaking of "relative speed of progression between the roll and the table," it will be understood that I am referring both to apparatus wherein there is a stationary table and rolls that move forward over it, and to that in which the revoluble rolls are mounted in a stationary frame and the table is moved forward. It will doubtless be found that in other arrangements and types of wire glass apparatus besides those specifically referred to, my improvement will have great utility.

Having thus described the invention, what is claimed as new and desired to be secured by Letters Patent is:

1. In a machine for making wire glass, a forming roller, and means for imparting an excessive peripheral speed to said forming roller, whereby the glass is crowded onto the wire mesh; substantially as described.

2. In a machine for making wire glass, a forming roller having a conjoined gear, the peripheral speed of said forming roller exceeding that of its conjoined gear, and a wire mesh which is buried beneath the sheet of glass formed by the crowding action of said forming roller; substantially as described.

3. In a machine for making wire glass, a forming roller having an uneven surface, the peripheral speed of said forming roller exceeding that of its conjoined gear, and a wire mesh which is buried beneath the sheet of glass formed by the crowding action of said forming roller; substantially as described.

4. In a machine for making wire glass, a forming roller having a longitudinally fluted surface, the peripheral speed of said forming roller exceeding that of its conjoined gear, and a wire mesh which is buried beneath the sheet of glass formed by the crowding action of said forming roller; substantially as described.

5. In a machine for making glass comprising a forming roller whose peripheral speed is greater than its advancing movement relative to the sheet being formed, and a following smoothing roller; substantially as described.

6. In a machine for making wire glass, a forming roller whose peripheral speed is greater than its advancing movement relative to the sheet of glass being formed, whereby the molten glass adjacent said forming roller is crowded onto the wire mesh, and means for smoothing the uneven surface of said sheet; substantially as described.

7. A machine for making glass, comprising a forming roller whose peripheral speed is greater than its advancing movement relative to the sheet of glass being formed, whereby an uneven surface is produced on the sheet of glass, and means for spreading a second layer or coating of glass over the uneven surface of the first formed sheet; substantially as described.

8. In a machine for making wire glass, the combination with a forming roller whose peripheral speed is greater than its advancing movement relative to the sheet of glass being formed, whereby the molten glass adjacent said sheet is crowded onto the wire mesh so as to bury said wire mesh in the sheet, and means for spreading a finishing layer or coating of glass upon the uneven surface of the first formed sheet; substantially as described.

9. In a machine for making glass, two rollers having different peripheral speeds and in the pass between which the sheet of glass is formed; substantially as described.

10. In a machine for making sheet glass, two rollers geared together and having different peripheral speeds, in the pass between which rollers the sheet of glass is formed; substantially as described.

11. In a machine for making sheet glass, two rollers in the pass between which the sheet of glass is formed, one of said rollers having a peripheral speed greater than the advancing movement of the sheet of glass; substantially as described.

12. In a machine for making sheet glass, two rollers in the pass between which the sheet of glass is formed, one of said rollers having a peripheral speed less than the advancing movement of the sheet of glass; substantially as described.

13. In a machine for making glass, two rollers having different peripheral speeds, in the pass between which the sheet of glass is formed, one surface of said sheet being uneven, and a smoothing roller having a peripheral speed equal to that of the glass; substantially as described.

14. In a machine for making glass, a forming roller having a peripheral speed greater than the advancing movement of the sheet of glass, and a smoothing roller having a peripheral speed substantially the same as that of the advancing glass; substantially as described.

15. In a machine for making glass, a forming roller having a peripheral speed less than that of the advancing glass, and a finishing roller having a peripheral speed equal to that of the advancing glass; substantially as described.

16. In a machine for making glass, two forming rollers, one having a peripheral speed greater than the advancing movement of the sheet of glass, and means for spreading a layer or coating of glass upon the uneven surface of the first-formed sheet; substantially as described.

17. In a machine for making glass, forming rollers having differential peripheral speeds, wire mesh which is arranged in the body of the glass, and means for smoothing the uneven surface of the glass; substantially as described.

18. In a machine for making wire glass, the combination with forming rollers having differential peripheral speeds, one of said rollers having a peripheral speed exceeding that of the advancing movement of the sheet of glass being formed, means for placing the wire in the body of said sheet of glass, and means for smoothing the uneven surface of said sheet; substantially as described.

19. In a machine for making wire glass, forming rollers having differential peripheral speeds, means for embedding a wire mesh into the sheet of glass so formed, means for separately forming another sheet of glass, and means for bringing the two sheets of glass together in welding relation to each other; substantially as described.

20. A machine for forming wire glass comprising forming rollers having differential peripheral speed, the peripheral speed of one of said rollers exceeding the advancing movement of the sheet of glass being formed, means for arranging a wire mesh in the body of said sheet, means for forming a separate sheet of glass, and means for welding the said separate sheet of glass to the uneven surface of the first-formed sheet; substantially as described.

21. The herein described method of making wire glass, consisting in spreading molten glass into sheet form, arranging wire mesh upon one surface thereof, and simultaneously crowding the glass constituting one surface of said sheet and longitudinally displacing the same onto said wire mesh; substantially as described.

22. The method of making wire glass which consists in rolling molten glass into sheet form, introducing a wire mesh thereinto, and simultaneously displacing the surface glass on one side of said sheet in a longitudinal direction onto said wire mesh; substantially as described.

23. The method of making wire glass consisting in forming a sheet of molten glass, embedding a wire mesh thereinto, and simultaneously subjecting one surface of said sheet to a wiping action so as to displace the surface glass and move it longitudinally over the wire mesh; substantially as described.

24. The method of making wire glass which consists in spreading molten glass into sheet form, introducing wire mesh into one surface of said sheet at the time it is being formed, and simultaneously crowding the glass adjacent the surface through which the wire mesh is introduced in a longitudinal direction onto and over the said wire mesh; substantially as described.

25. The herein described method of making wire-glass which consists in forming a sheet of glass with a web of wire buried beneath its surface and within its body and with protrusions of soft or unchilled glass upon its surface, and in spreading upon the protrusion-bearing surface of such sheet when newly formed a final finishing layer of glass.

26. In a machine for making wire-glass the combination with means for forming a sheet of glass having a web of wire buried beneath its surface and within its body and having also protuberances of soft or unchilled glass upon its surface, of means for spreading upon the protrusion-bearing surface of such sheet a final finishing layer of glass.

27. In a machine for making wire glass, a roller for embedding wire in the molten glass, said roller having means for simultaneously crowding back the glass adjacent the surface relative to the table through which the wire mesh is introduced in a longitudinal direction onto and over the wire mesh, substantially as described.

28. In a machine for making wire glass, a roller for embedding the wire in the molten glass when rolled into sheet form, that is provided with longitudinal corrugations or paddles whereby wire is introduced into the sheet and the surface thereof displaced rearwardly with respect to the table as the roll is moved forward.

29. In a machine for making wire glass, the combination of a table and a plurality of rolls geared to move longitudinally at a predetermined rate relative to the table, one of said rolls being provided with means whereby wire is introduced into the molten glass and the surface of said glass is simultaneously displaced rearwardly with respect to the table as the roll is advanced over the table.

In testimony whereof I hereunto affix my signature in the presence of two witnesses, this 28th day of June 1907.

ARTHUR J. BALDWIN.

Witnesses:
PHILIP S. HILL,
EDWARD T. MAGOFFIN.